United States Patent [19]
Taylor et al.

[11] Patent Number: 5,503,294
[45] Date of Patent: Apr. 2, 1996

[54] CONTAINMENT BASIN FOR CONTAINING LIQUID SPILLAGE FROM A PORTABLE STORAGE TANK

[75] Inventors: Curtis P. Taylor, Chagrin Falls; George L. Barber, Twinsburg, both of Ohio

[73] Assignee: Hoover Group, Inc., Alpharetta, Ga.

[21] Appl. No.: 113,198

[22] Filed: Aug. 30, 1993

[51] Int. Cl.[6] .................................................. B65D 1/34
[52] U.S. Cl. .................................. 220/571; 220/558
[58] Field of Search .................................. 220/7, 6, 571, 220/558, 671, 670, 669, 675, 677, 400, 410, 408, 23.83, 339, 720, 681, 682, 692, 693, 4.08, 4.09, 4.11

[56] References Cited

U.S. PATENT DOCUMENTS

| 139,653 | 6/1873 | Bentley | 220/558 |
| 177,114 | 5/1876 | Gilbert | 220/671 |
| 534,957 | 2/1895 | Ingraham | 220/671 |
| 1,019,255 | 3/1912 | Ickes | 220/4.11 |
| 2,026,311 | 12/1935 | Harris | 220/692 |
| 3,900,157 | 8/1975 | Roth | 220/7 |
| 4,399,666 | 8/1983 | Sakutori | 220/720 |
| 5,090,588 | 2/1992 | Van Romer et al. | 220/666 |

*Primary Examiner*—Stephen J. Castellano
*Attorney, Agent, or Firm*—Harness, Dickey & Pierce

[57] ABSTRACT

A containment basin for containing liquid spillage from a portable storage tank in which one end wall is rotatable from an upright operative position to a lowered position aligned with the surrounding floor to enable a portable storage tank to be moved into the containment basin on a wheeled dolly without the need for lifting of the storage tank.

5 Claims, 2 Drawing Sheets

5,503,294

CONTAINMENT BASIN FOR CONTAINING LIQUID SPILLAGE FROM A PORTABLE STORAGE TANK

BACKGROUND AND SUMMARY OF THE INVENTION

The present invention relates generally to containment basins and in particularly to a containment basin for a portable storage tank to contain liquid spillage from the tank.

A variety of liquid materials are supplied from the material producer to the end user in transportable storage tanks such as the reusable container disclosed in patent application Ser. No. 07/871,284, filed Apr. 20, 1992, commonly assigned and hereby incorporated by reference. This container includes a lower discharge fitting and valve for use in removing the liquid contents. In many instances, the lower discharge valve will be connected directly to the equipment using the supplied liquid material. Once connected, the discharge valve is opened and the liquid contents are used as needed. When a tank is used that does not have a lower outlet, the top opening of the tank is opened and a pump is used to remove the tank contents.

During use, it is not uncommon for a certain amount of spillage to occur from the tank during the process of connecting or disconnecting the tank. Faulty valves and fittings, etc., can also result in leakage. Depending upon the liquid material, environmental or workplace safety regulations may require that the spilled liquid be contained for proper disposal. Furthermore, good housekeeping may require containment of the liquid spillage to prevent the spilled liquid from covering the floor of the workplace. To accomplish this, portable tanks are placed in containment basins having raised side walls to surround the tank and contain any spilled liquid. To be effective, the containment basins must be capable of containing 100% of the tank contents. As a result, the basin side walls are of a substantial height in order to minimize the floor space covered by the basin.

One difficulty with such a containment basin is that the tank must be raised over the basin side wall or lowered into a basin formed in a recess in the floor. With a storage tank of any significant size, a forklift or other mechanical hoist is required to lift the tank into and out of the basin.

Accordingly, it is an object of the present invention to provide a containment which overcomes the above disadvantage to enable a portable tank to be moved into the containment basin or removed from the basin on a wheeled dolly, without lifting of the tank.

The containment basin of the present invention includes a bottom panel and an upstanding wall extending generally upwardly from the periphery of the bottom panel to an open upper end. The basin bottom panel and side wall thus enclose a volume of space open from above. The upstanding wall includes a pair of spaced opposing end portions and a pair of spaced opposing side portions adjacent to the end portions. The basin further includes a hinge portion between the bottom panel and one of the end portions for enabling the end portion to be rotated between an upstanding operative position and a lowered position aligned with the surrounding floor whereby a portable storage tank can be moved onto the bottom panel and removed from the bottom panel with a wheeled dolly, eliminating the need for lifting of the storage tank. A seal is provided between the movable end portion and the two adjacent side portions of the upstanding wall to prevent leakage of liquid during use of the containment basin.

In a preferred embodiment, the seal is in the form of a flexible fan member attached to the side and end portions of the wall which is expandable in an accordion like fashion as the end portion is rotated from the upstanding operative position to the lowered position.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
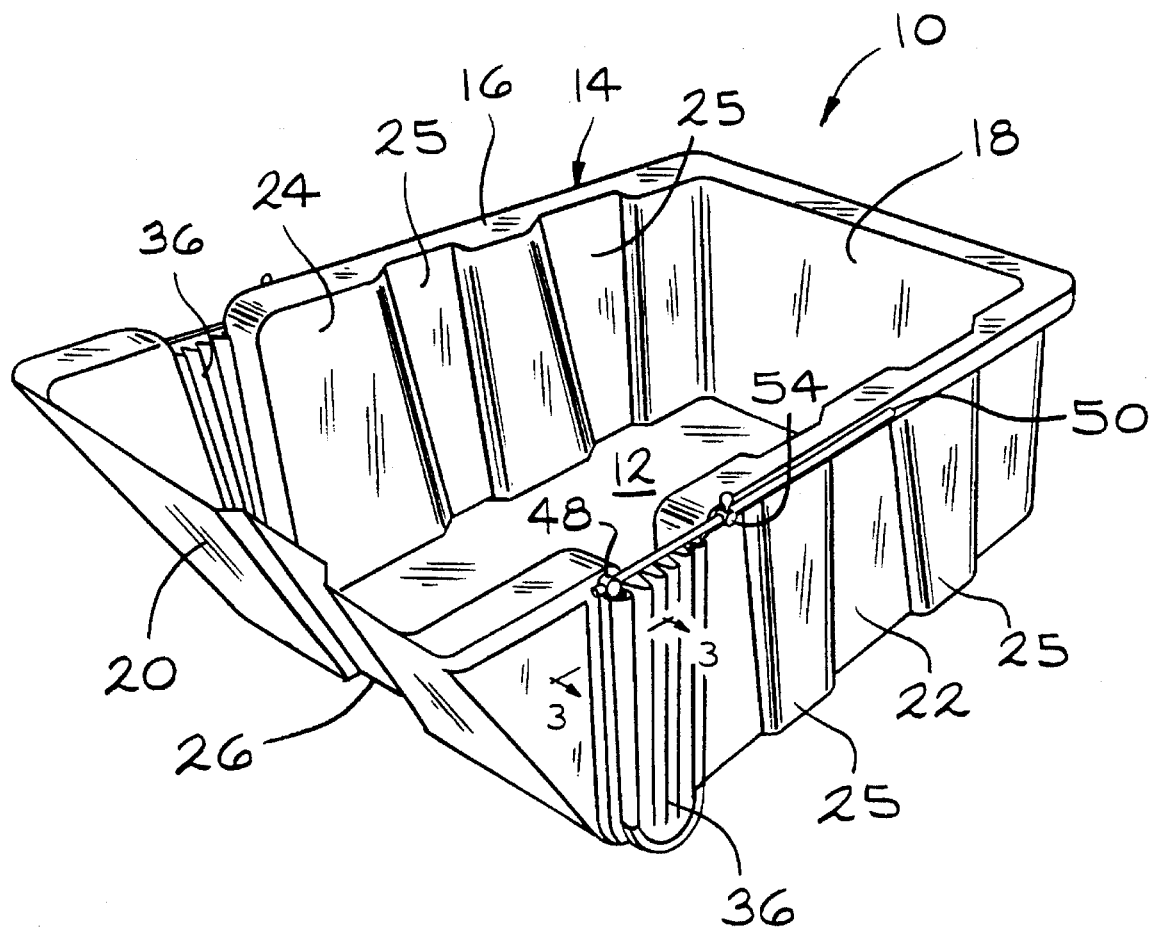
FIG. 1 is a perspective view showing the containment basin of the present invention with the movable end portion of the wall in its upstanding operative position.

The containment basin of the present invention is shown in FIG. 1 and designated generally at 10. Basin 10 includes a bottom panel 12 and an upstanding wall 14. The upstanding wall 14 extends generally upwardly from the periphery of the bottom panel 12 to the upper end 16 of the basin. The basin is open at the upper end 16 such that the basin encloses a substantial volume of space, open from above.

The wall 14 includes spaced opposing end portions 18 and 20 at opposite ends of the basin and spaced opposing side portions 22 and 24. The basin is preferably made of a one piece molding or PVC, polyethylene, polypropelene, or any of a variety of thermoplastic materials having desirable strength and corrosion resistance properties. Vertical embossments 25 are formed in the upstanding wall 14 to provide additional strength to the wall.

The basin is formed with a flexible portion connecting the end portion 20 of the upstanding wall with the bottom panel 12 so as to form a hinge 26. The hinge 26 enables the end portion 20 to be rotated between the upstanding operative position shown in FIG. 1 and a lowered position shown in FIG. 2. In the upstanding operative position, the upper end of end portion 20 is at the same vertical level as the upper end of the remainder of the upstanding wall. In the lowered position, the movable end portion 20 is substantially aligned with the surrounding floor 28.

Figure 2:
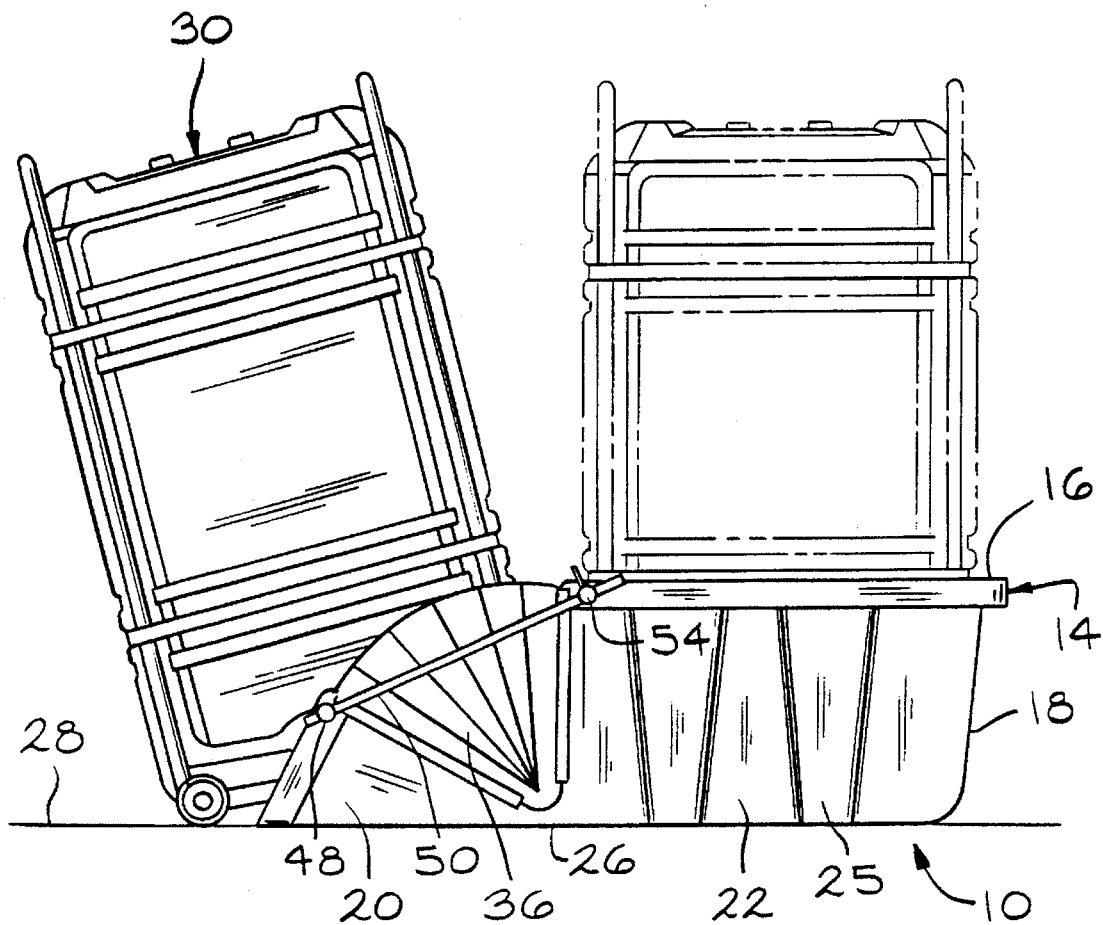
FIG. 2 is a side view of the containment basin of the present invention with the movable end portion of the wall rotated downward into alignment with the surrounding floor showing a portable container being moved into the containment basin.

With the end portion 20 in the lowered position, a portable storage tank such as the tank 30 shown in FIG. 2 can be wheeled into the containment basin on a wheeled dolly or on wheels integral with the tank. Once the portable tank is loaded onto the containment basin, the end portion 20 is returned to its upstanding operative position whereby the basin 10 can contain any liquid spillage from the tank 30 or from the connections of the tank to nearby equipment.

A seal structure 32 is provided on each side of the basin to seal the movable end portion 20 to the adjacent side portions 22 and 24 of the upstanding wall between the bottom panel and the upper end 16 of the wall. The seal structure 32 prevents leakage of any liquid from the containment basin between the movable end portion and side portions of the wall.

Figure 3:
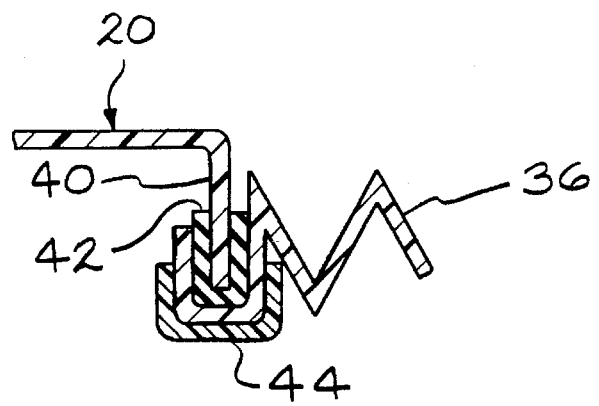
FIG. 3 is a sectional view as seen substantially from the line 3—3 of FIG. 1 illustrating the seal between the side portion and movable end portion of the basin wall.

In the preferred embodiment, the seal structure 32 is in the form of an accordion like ribbed fan 36 sealingly connected to the movable end portion and the adjacent side portion. The two side edges of the fan are coupled to flanges 40 formed in the end and the side portions of the wall. With reference to FIG. 3, the connection of the fan to the end portion is shown in greater detail. A gasket 42 is placed between the flange 40 of the end portion 20 and the fan 36. The fan can be attached by adhesive or other means. Furthermore, a stabilizing member 44 can be press fit over the fan and gasket onto the flange 40. The ribbed fan forms an expandable wall portion which expands in an accordion fashion as the end portion 20 is rotated to its lower position, to maintain the sealed connection between the end portion and the adjacent side portions of the wall 14.

It is possible to construct the basin with a releasable seal between the movable end portion 20 and its adjacent side portions. During loading and unloading of a portable tank, there is no need for a seal. However, the use of a ribbed fan seal instead of a releasable seal eliminates the need for positive action to re-engage the seal.

A rod guide 48 is pivotally mounted to each side of the end portion 20 at its upper end, adjacent to the ribbed fan 36. One end of a pair of holding rods 50 is secured to each rod guide 48. The holding rods 50 each slide through rod guides 52 pivotally mounted to the side portions 22 and 24 at their upper ends adjacent to the ribbed fans 36. Rod guides 52 are likewise rotatably mounted to the side portions. Once the movable end portion has been lowered, the rods 50 operate to hold the end portion 20 in place, in opposition to hinge forces tending to raise the end portion 20. The holding rods can operate by a friction fit between the rods and the rod guides 52 or, the rod guides 52 can each be equipped with a thumb screw 54 that is tightened against the rods to hold the rods in place.

The fan 36 can be made of PVC, polyethylene or a plastic coated fabric. The gasket 42 can be an extrusion of soft vinyl or a mastic type of adhesive. The stabilizing member 44 is preferably made of a relatively stiff material such as aluminum to provide additional support.

While the terms "end" and "side" have been used to describe the various portions of the containment basin wall, nothing should be construed as limiting the containment basin of the present invention to having the movable wall portion be one of the shorter sides of a rectangular structure. One of the longer side portions could easily be made to rotate if desired.

The containment basin of the present invention is easy to load portable storage tanks into and to remove the storage tanks from the basin by eliminating the need for lifting of the tanks over the wall of the basin. As a result of the convenience in using the containment basin, it is more likely that the basin will be used, providing improved working conditions.

It is to be understood that the invention is not limited to the exact construction illustrated and described above, but that various changes and modifications may be made without departing from the spirit and scope of the invention as defined in the following claims.

We claim:

1. A containment basin for containing liquid spillage from a portable storage tank comprising:

a bottom panel;

an upstanding wall extending generally upwardly from the periphery of said bottom panel to an upper end of said basin, said upstanding wall having a pair of spaced opposing end portions and spaced opposing side portions, said basin being open at the upper end of said upstanding wall whereby said bottom panel and said wall enclose a volume of space open from above;

hinge means between said bottom panel and one of said end portions for enabling said one end portion to be rotated between an upstanding operative position and a lowered position aligned with a surrounding floor whereby the portable storage tank can be moved onto said bottom panel and removed from said bottom panel on a wheeled dolly without the need for lifting of the portable storage tank; and seal means between and connected to said one end portion and said side portions for sealing said one end portion to said side portions to prevent leakage of liquid spillage from said containment basin.

2. The containment basin of claim 1 wherein said seal means includes first and second ribbed fan members, said first ribbed fan member being sealingly coupled to said one end portion and to one of said side portions and said second ribbed fan member being sealingly coupled to said one end portion and to the other of said side portions whereby said first and second ribbed fan members form expanding wall portions between said one end portion and said side portions.

3. The containment basin of claim 1 further comprising holding means for selectively holding said one end portion in said upstanding operative position and said lowered position.

4. The containment basin of claim 3 wherein said holding means includes:

a holding rod attached to the upper end of said one end portion; and attaching means for slidably attaching said holding rod to the upper end of one of said side portions, said attaching means including means for selectively securing said holding rod thereto to prevent sliding of said holding rod relative to said side portion whereby said holding rod is operable to hold said one end portion in a selected position.

5. The containment basin of claim 4 wherein said attaching means includes a rod guide attached to said one of said side portions and said means for selectively securing said holding rod thereto includes a thumb screw in said rod guide which can be selectively rotated into a position engaging said holding rod to prevent sliding of said holding rod relative to said rod guide.

* * * * *